Sept. 15, 1936.     F. W. STILWELL     2,054,305
VEHICLE SPRING
Filed Sept. 20, 1929     2 Sheets-Sheet 1
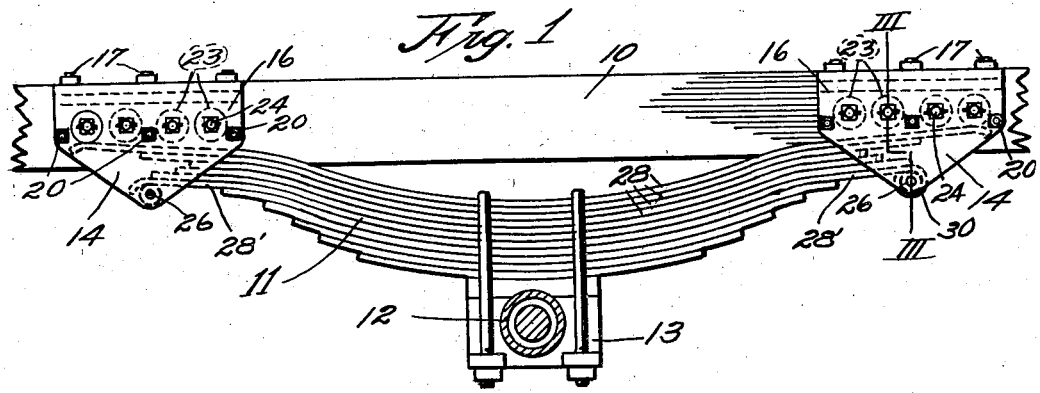
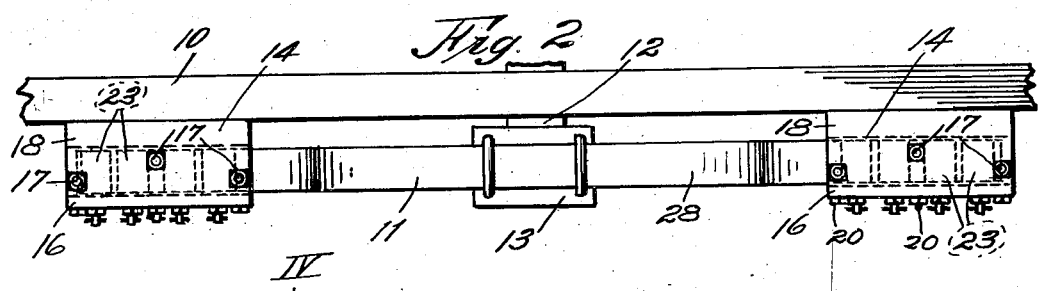
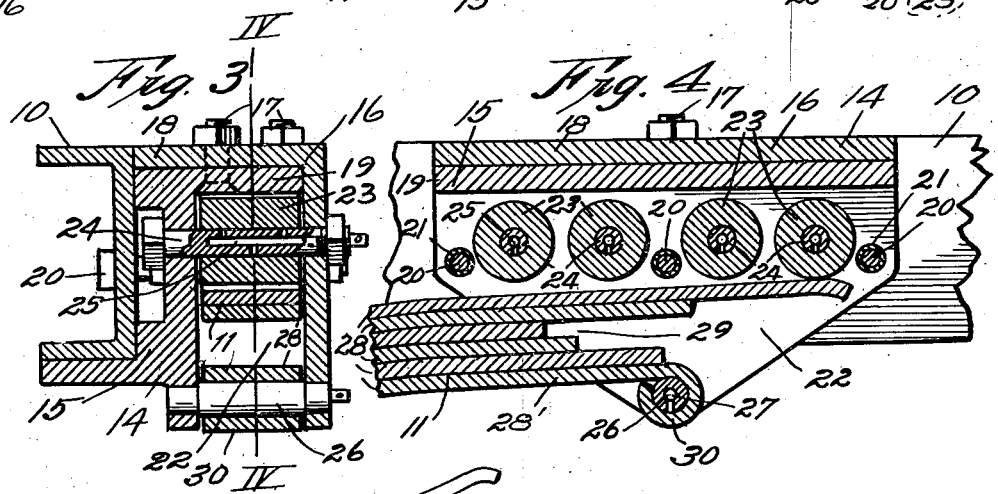
INVENTOR
Fred W. Stilwell
BY Roy E. Hamilton
ATTORNEY Sept. 15, 1936.   F. W. STILWELL   2,054,305
VEHICLE SPRING
Filed Sept. 20, 1929   2 Sheets-Sheet 2
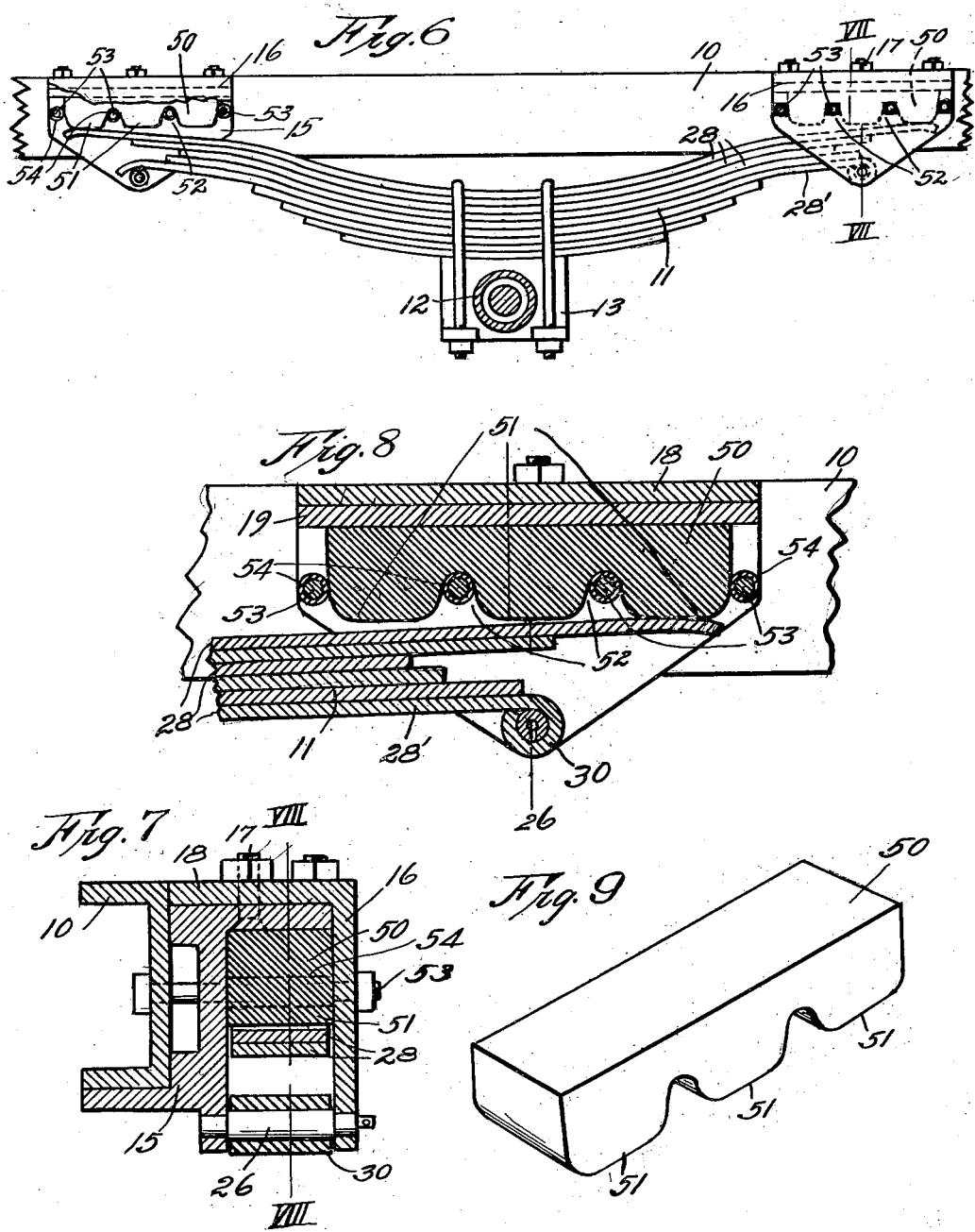
INVENTOR
Fred W. Stilwell
BY Roy E. Hamilton
ATTORNEY Patented Sept. 15, 1936

2,054,305

UNITED STATES PATENT OFFICE 2,054,305

VEHICLE SPRING

Fred W. Stilwell, Kansas City, Mo.

Application September 20, 1929, Serial No. 393,958

13 Claims. (Cl. 267—44)

This invention relates to vehicle spring suspension and particularly to that class of spring suspensions which are adapted to permit the shorting of the distance between the end supporting points of the spring as the load is increased thereon and also to retard the rebound when the load is dropped.

The principal object of the invention is the provision in a spring construction adapted for motor-driven vehicles, of the combination of a variable rate adjustment for adjusting the points of suspension of the spring as the load is varied, a rebound check member for retarding the rebound of the vehicle frame carried by the spring, and a drive means through the spring structure.

Another object of this invention is the provision of a simply and sturdily constructed device having a laminated curved spring of special construction so mounted as to retard the rebound of the vehicle frame which is carried by the spring.

A further object of this invention is the provision of a novel and simply constructed device that may be placed on any standard make of vehicle using laminated semi-elliptic springs, to adjust its points of suspension along the top lamina of said spring as the load is increased or decreased.

Another object of the present invention is the provision of vehicle spring suspension having a series of laminae mounted in a suspension member under compression to serve as a rebound check and to serve to prevent side sway.

A further object of this invention is the provision of spring suspension having a series of rollers adapted to serve as bearings for the opposite ends of a semi-elliptic spring, successive rollers coming in contact with the spring as the load is gradually increased to shorten the length of the operating portion of said spring.

With these major objects in view as well as minor objects which will appear during the course of the detailed specification, reference will now be made to the accompanying drawings in which:

Figure 1 is a fragmentary view of a vehicle showing a spring suspension embodying this invention;

Fig. 2 is a plan view of Fig. 1;

Fig. 3 is an enlarged cross section taken on line III—III of Fig. 1;

Fig. 4 is a vertical section taken on line IV—IV of Fig. 3;

Fig. 5 is a side elevation of the end of the laminated semi-elliptic leaf spring showing the natural relative position of the laminae in solid lines and dotted in the compressed or operative position;

Fig. 6 is a side elevation of a form similar to that shown in Fig. 1, with a rubber block substituted for the rollers;

Fig. 7 is an enlarged cross section taken on line VII—VII of Fig. 6;

Fig. 8 is a longitudinal sectional view taken on line VIII—VIII of Fig. 7;

Fig. 9 is a perspective view of the rubber block detached.

Similar reference characters designate like parts throughout the several views and the numeral 10 designates the frame of any ordinary vehicle, 11 is a laminated semi-elliptical spring, comprising a series of leaves of varying length, rigidly supported by axle housing 12 through the use of a suitable member 13.

In the form of spring suspension as shown in Figs. 1, 2, 3, 4, and 5, a drive, in which the rear exle is connected with the frame through the chassis spring, only, is required.

Rigidly attached to frame 10 at substantially equal distances from the axle housing 12 are two brackets 14 which extend outwardly from one side of said frame a sufficient distance to properly aline with the springs 11 of the ordinary vehicle. Each bracket 14 comprises two members 15 and 16 respectively, which are bolted together at the top by means of bolts 17 and with the inturned flange 18 of 16 positioned on top of the outturned flange 19 of 15. When thus bolted together bracket 14 is bolted to the frame 10 by means of bolts 20 which extend through both members 15 and 16 and also through frame member 10. Positioned on bolts 20 intermediate members 15 and 16 are spacing sleeves 21 which assist in maintaining said members in fixed relative spaced apart relation to form a downturned channel 22. Positioned in channel 22 is a series of rollers 23 each mounted on an axle 24 which is provided with any suitable lubricating system 25. The lower edges of rollers 23 are in horizontal alinement and positioned below the plane of the lower surface of the sleeves 21 thus making it possible for the plane upper surface of the upper leaf or lamina of spring 11 to contact said rollers without coming in contact with said sleeves. Positioned adjacent the center portion of bracket 14 and below rollers 23 is a pin 26 provided with a lubricating means 27. The laminated semi-elliptical spring 11 consists of a series of laminae or leaves 28 which are secured together one above the other to form a composite spring member. While a spring of elliptical form is ordinarily used, yet it is apparent that the spring may vary in shape without departing from the invention.

Referring to Fig. 1, in which the spring is shown positioned relative to the bearing rollers 23 without any excessive load carried by the frame, it will be noted that the outer rollers of the two series of rollers resting against the top spring adjacent the outer ends thereof while said spring extends inwardly and downwardly from said outer rollers 23 in such a manner that it does not contact with any of the other rollers of the series. The extreme outer ends of the upper leaf spring are turned slightly downward to prevent accidental gouging of the roller when the spring is operated. Intermediate leaf designated as 28' is coiled about pin 26 at 30 in such a manner that when power is applied to the axle in the usual manner said power will be transmitted to leaf 28' to carry the load forward or backward with the vehicle. It will be noted by referring to Fig. 4, that some of the leaf springs intermediate leaf 28' and the top leaf 28 are shorter than said leaves, thus causing a space 29 therebetween to allow the free action of spring 28' and its overlapping leaves without contacting with the upper leaf and its coacting leaf. Each end of the spring 11 is made with normally outwardly divergent leaves as shown by the solid lines in Fig. 5. When the spring leaves are compressed to the position shown in dotted lines which is the normal position when in use and positioned in the bracket 14 as clearly shown in Fig. 4, they will exert an upward pressure against roller 23 and a downward pressure against pin 26 so that any movement of the spring or its suspension members that would naturally tend to move either leaf 28' or the upper leaf from their contact points will be prevented by the action of the spring.

As the load is increased on the frame the elliptical spring will be partially straightened out so that the upper spring leaf will contact with intermediate rollers 23, thereby shortening the distance between the contacting points of the spring with the frame, thereby increasing its carrying strength. The limit of this adjustment is determined by the length of the series of rollers which may be varied to suit any load or condition. When the load is sufficient to compress the spring so that the innermost rollers of the series serve as contacting points for the spring, leaf 28' will still be under tension thus preventing any slapping of the parts and also serving to support the load.

In case of rebound, leaf 28' with its two coacting leaves which are normally positioned to have a pulling down effect on the frame through the pin 26 will resist the upward movement of the frame and prevent any excessive rebound thereby causing the loaded vehicle to move much more smoothly than with the ordinary semi-elliptical spring.

The modified form shown in Figs. 6, 7, 8, and 9 is similar to that shown in Fig. 1, with the exception that the rollers which take the load are eliminated and the rubber block 50, with means for supporting, is substituted therefore. The resilient block 50, made preferably of a suitable rubber, is provided with a plurality of depending, spaced apart projections 51, the lower surfaces of which are in horizontal alignment when the block is placed in operative position in channel 22, formed by bracket members 15 and 16. When the spring is in operative relation with the rubber block without any excessive load carried by the frame it will be noted that the outer portions of the blocks will be in contact with the spring 11.

Furthermore as the load is increased successive projections 51 will come in contact with the spring to shorten the length of the operating portion thereof.

Between the projections 51 of the block 50 are recesses 52 in which bolts 53, which pass through holes in bracket members 15 and 16 and the frame 10, are fitted to support the rubber in operative position. Also bolts 53 may be provided at each end of the block 50 as shown.

Between the bracket members 15 and 16 the bolts 53 are provided with spacing sleeves 54 which are in contact with the rubber block.

The shape, size and composition of the resilient rubber block, may be altered to meet the requirements for different conditions. The rubber block is so mounted that it will adjust itself to the varying positions of the spring as the load is changed.

Since in all the forms of spring suspension as shown, the separated leaves are mounted in the brackets under compression, the side sway of the frame and load thereon will be greatly reduced since the spring and its holding parts will be maintained in relatively fixed relation under tension suitable for that particular vehicle.

I do not desire to limit this invention to the structure shown and described since many modifications may be made without departing from the spirit of the appended claims.

What I claim is:

1. The combination with the frame and axle of a vehicle, of a laminated spring, having bifurcated ends, supported adjacent its center portion on said axle, with its opposite bifurcated ends positioned under compression between members carried by said frame, one end of one of the intermediate lamina of said spring being secured to said frame to preclude relative longitudinal movement of the frame and said end of the lamina.

2. The combination with the frame and axle of a vehicle, of a pair of brackets rigidly supported by said frame, a laminated spring supported adjacent its central portion on said axle with opposite ends thereof positioned under compression in said brackets respectively and having one end of one of the intermediate lamina of said spring pivotally carried by one of said brackets.

3. The combination with the frame and axle of a vehicle, of a pair of brackets supported by said frame, a laminated spring, having bifurcated ends and supported adjacent its central portion on said axle with opposite ends thereof positioned under compression in said brackets respectively, one end of said spring being secured to its adjacent bracket to prevent relative longitudinal movement of said frame and the attached end of said spring.

4. The combination with the frame and axle of a vehicle, of a pair of spaced apart brackets rigidly supported by said frame, a laminated leaf spring supported adjacent its central portion on said axle with its opposite ends mounted respectively in said pair of brackets, the leaves at each end of said spring being positioned under compression in said brackets respectively and one end of one of the intermediate spring laminae being pivotally carried by its adjacent bracket.

5. In a vehicle spring suspension, means for retarding the rebound of the vehicle frame, comprising, in combination, a pair of brackets rigidly supported by said frame, a laminated semi-elliptical spring having bifurcated ends, each of said bifurcated ends being mounted under compression in said brackets respectively and one end of an intermediate lamina of said spring being pivotally mounted to its adjacent bracket.

6. In a vehicle spring suspension, means for moving the load bearing points toward or away from the center of the spring as the weight on the vehicle frame is varied, comprising, in combination, a pair of brackets rigidly supported on said vehicle frame adjacent the ends of said spring each having a set of horizontally disposed spring bearing members and a pin spaced therebelow between which opposite ends respectively of the spring are positioned under compression with one end of the spring pivotally secured to its adjacent bracket.

7. In a vehicle spring suspension, means for retarding the rebound of the vehicle frame, comprising, in combination, a semi-elliptical laminated spring having horizontally bifurcated ends mounted on said frame and having an intermediate lamina of greater length than the adjacent lamina on either side thereof, and a pin carried by said frame beneath and adjacent each end respectively of said spring to maintain the bifurcated ends thereof in a compressed position.

8. In a vehicle spring suspension, means for retarding the rebound of the vehicle frame, comprising, in combination, a pair of brackets rigidly supported by said frame, each of said brackets having a series of horizontally disposed spring bearing members and a pin positioned below said series of spring bearing members and spaced apart therefrom, a laminated semi-elliptical spring having a top lamina and a lower lamina shorter than said top lamina, with laminae shorter than said lower lamina positioned therebetween cooperating with said series of spring bearing members and pins to support said frame.

9. In a vehicle spring suspension, means for retarding the rebound of the vehicle frame, comprising, in combination, a pair of brackets rigidly supported by said frame, each of said brackets having a series of horizontally disposed spring bearing members and a pin positioned below said series of spring bearing members and spaced apart therefrom, a laminated semi-elliptical spring having a top lamina and a lower lamina with shorter laminae positioned therebetween, opposite ends of said laminated spring being mounted, under compression, in said brackets respectively, one end of said lower lamina being pivotally secured to its respective bracket.

10. In a vehicle spring suspension, means for retarding the rebound of the vehicle frame, comprising, in combination, a pair of brackets rigidly supported by said frame, each of said brackets having a series of horizontally disposed rollers and a pin positioned below said series of rollers and spaced apart therefrom, a laminated semi-elliptical spring supported adjacent its center position to the axle of the vehicle and having spaced apart laminae adjacent opposite ends thereof carried by said brackets respectively, said laminae at opposite ends of said spring being held under compression between said series of rollers and said pin.

11. A laminated spring construction for carrying the frame of a motor-driven vehicle and connected to an axle on said vehicle, means for supporting said spring on the frame whereby the spring is retained under compression, said supporting means being provided with a variable rate adjusting means for adjusting the points of suspension of said spring as the load is varied, means for checking the rebound of said frame, and a driving member forming a part of said spring.

12. A laminated spring construction for carrying the frame of a motor-driven vehicle and connected to an axle on said vehicle, spaced brackets on said frame for supporting the spring, an end of one of the laminae being connected to a bracket whereby to provide a driving connection between the axle and frame, resilient members mounted in the brackets, a lamina of said spring having its ends adapted to contact said members whereby to provide a variable rate adjustment of the spring as the load on the frame is varied, and means for checking the rebound of said frame upon a decrease in the load on the frame.

13. A laminated spring construction for carrying the frame of a motor-driven vehicle and connected to an axle on said vehicle, means for supporting said spring on the frame whereby the spring is retained under compression, said supporting means being provided with a variable rate adjusting means for adjusting the points of suspension of said spring as the load is varied, means for checking the rebound of said frame, and a driving member forming a part of said spring and directly connected to the frame.

FRED W. STILWELL.